United States Patent
Lee

(10) Patent No.: US 9,626,956 B2
(45) Date of Patent: Apr. 18, 2017

(54) METHOD AND DEVICE FOR PREPROCESSING SPEECH SIGNAL

(71) Applicant: SAMSUNG ELECTRONICS CO., LTD., Suwon-si (KR)

(72) Inventor: Hodong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/680,366

(22) Filed: Apr. 7, 2015

(65) Prior Publication Data

US 2016/0093293 A1    Mar. 31, 2016

(30) Foreign Application Priority Data

Sep. 26, 2014   (KR) ........................ 10-2014-0129479

(51) Int. Cl.
| | | |
|---|---|---|
| *G10L 17/00* | (2013.01) | |
| *G10L 15/02* | (2006.01) | |
| *G10L 15/187* | (2013.01) | |
| *G10L 15/04* | (2013.01) | |

(52) U.S. Cl.
CPC ............ *G10L 15/02* (2013.01); *H05K 999/99* (2013.01); *G10L 15/04* (2013.01); *G10L 15/187* (2013.01); *G10L 2015/025* (2013.01)

(58) Field of Classification Search
CPC ....... G10L 15/22; G10L 15/30; G10L 15/265; G10L 15/00; G10L 15/02; G10L 15/063; G10L 15/04; G10L 15/08; G10L 15/187; G10L 17/04; H05K 999/99
USPC ........ 704/231, 243, 249, 251, 254, 270, 278
See application file for complete search history.

(56) References Cited

U.S. PATENT DOCUMENTS

| | | | |
|---|---|---|---|
| 7,302,393 B2 | 11/2007 | Fischer et al. | |
| 7,509,258 B1 | 3/2009 | Roy | |
| 2004/0267540 A1* | 12/2004 | Boillot | ............... G10L 21/04 704/278 |
| 2009/0103517 A1* | 4/2009 | Ohmuro | ............... G10L 19/005 370/352 |
| 2012/0253812 A1 | 10/2012 | Kalinli et al. | |
| 2014/0136198 A1 | 5/2014 | Bao et al. | |

FOREIGN PATENT DOCUMENTS

| | | |
|---|---|---|
| KR | 10-1997-0049740 A | 7/1997 |
| KR | 10-2000-0018248 A | 4/2000 |
| KR | 10-2004-0061070 A | 7/2004 |
| KR | 10-2006-0047451 A | 5/2006 |
| KR | 10-0735820 B1 | 6/2007 |
| KR | 10-2008-0052268 A | 6/2008 |
| KR | 10-2011-0010243 A | 2/2011 |
| KR | 10-2012-0056661 A | 6/2012 |
| KR | 10-2012-0072145 A | 7/2012 |
| KR | 10-2013-0085813 A | 7/2013 |
| KR | 10-2013-0133858 A | 12/2013 |

* cited by examiner

*Primary Examiner* — Vu B Hang
(74) *Attorney, Agent, or Firm* — NSIP Law

(57) ABSTRACT

A method and a device that preprocess a speech signal are disclosed, which include extracting at least one frame corresponding to a speech recognition range from frames included in a speech signal, generating a supplementary frame to supplement speech recognition with respect to the speech recognition range based on the at least one extracted frame, and outputting a preprocessed speech signal including the supplementary frame along with the frames of the speech signal.

23 Claims, 10 Drawing Sheets

METHOD AND DEVICE FOR PREPROCESSING SPEECH SIGNAL

CROSS-REFERENCE TO RELATED APPLICATION

This application claims the benefit under 35 USC §119(a) of Korean Patent Application No. 10-2014-0129479, filed on Sep. 26, 2014, in the Korean Intellectual Property Office, the entire disclosure of which is incorporated herein by reference for all purposes.

BACKGROUND

1. Field

The following description relates to a method and a device for speech signal preprocessing.

2. Description of Related Art

Speech recognition technology is becoming more prevalent due to popularization of speech capable devices, such as smartphones and tablet computers. Speech recognition technology can facilitate control of user devices making them easier for users to operate.

One aspect of speech recognition technology relates to recognizing the speech from a user as corresponding to a specific language.

Accuracy of the speech recognition technology is still relatively low. For example, speech recognition technology may process an input speech signal by dividing the speech signal into predetermined units or frames. One frame is selected as a boundary from among successive frames. Speech recognition is performed by classifying the frames into a previous frame and a subsequent frame based on the frame selected as the boundary. If a frame is only used to recognize a single phoneme, information about another phoneme included in the frame may not be used to recognize a subsequent phoneme. As a result, the accuracy of the speech recognition may suffer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of preprocessing a speech signal including a plurality of frames includes: extracting a frame corresponding to a speech recognition range from the plurality of frames in the speech signal; generating a supplementary frame from the extracted frame to supplement speech recognition of the speech signal with respect to the speech recognition range; and outputting a preprocessed speech signal comprising the supplementary frame and the plurality of frames of the speech signal.

The plurality of frames of the speech signal may be generated by dividing the speech signal at intervals shorter than the length of the plurality of frames to include an overlapping range between at least successive frames of the plurality of frames, and the extracting of the frame may include extracting, from the plurality of frames of the speech signal, a frame comprising a boundary that partitions the speech recognition range based on boundary information associated with the extracted frame.

The generating of the supplementary frame may include generating the supplementary frame by copying the extracted frame.

The extracting of a frame corresponding to a speech recognition range from the plurality of frames in the speech signal may include extracting a plurality of frames; and the generating of the supplementary frame may include generating the supplementary frame by copying a plurality of the extracted frames.

The generating of the supplementary frame may include generating a supplementary frame by reconstructing the extracted frame.

The extracting of a frame corresponding to a speech recognition range from the plurality of frames in the speech signal may include extracting a plurality of frames; and the generating of the supplementary frame may include generating the supplementary frame by reconstructing a plurality of the extracted frames. The method generating the supplementary frame by reconstructing a plurality of the extracted frames also may include generating the supplementary frame having a length longer than the plurality of frames of the speech signal and including a feature vector of the plurality of extracted frames. The generating the supplementary frame by reconstructing a plurality of the extracted frames also may include generating the supplementary frame by applying a weighted value to each extracted frame that is inversely proportional to the interval of time between the start of each extracted frame and a boundary that partitions the speech recognition range included in the each extracted frame.

The generating of the supplementary frame may include generating the supplementary frame by reconstructing the extracted frame based on a portion of the extracted frame corresponding to the speech recognition range.

The generating of the supplementary frame may include applying a weighted value to the extracted frame, the weighted value based on time information associated with the extracted frame.

The generating of the supplementary frame may include generating of the supplementary frame based on a loss range of the extracted frame by one of copying the extracted frame and reconstructing the extracted frame. The loss range of the extracted frame may correspond to a remainder of a range of the extracted frame from which the speech recognition range has been excluded.

The method may further comprising disposing the supplementary frame among the plurality of frames based on time information associated with the supplementary frame to generate the preprocessed signal.

The speech recognition range may correspond to any one unit of a phoneme, a syllable, and a word included in the speech signal.

In another general aspect, a speech signal preprocessing device, includes: an input device configured to receive a speech signal including a plurality of frames; a processing device configured to extract a frame corresponding to a speech recognition range from the plurality of frames in the speech signal; to generate a supplementary frame from the extracted frame to supplement speech recognition of the speech signal with respect to the speech recognition range; and generate a preprocessed signal comprising the supplementary frame and the plurality of frames; and an output device configured to output the preprocessed speech signal. Other features and aspects will be apparent from the following detailed description, the drawings, and the claims.

Figure 1:
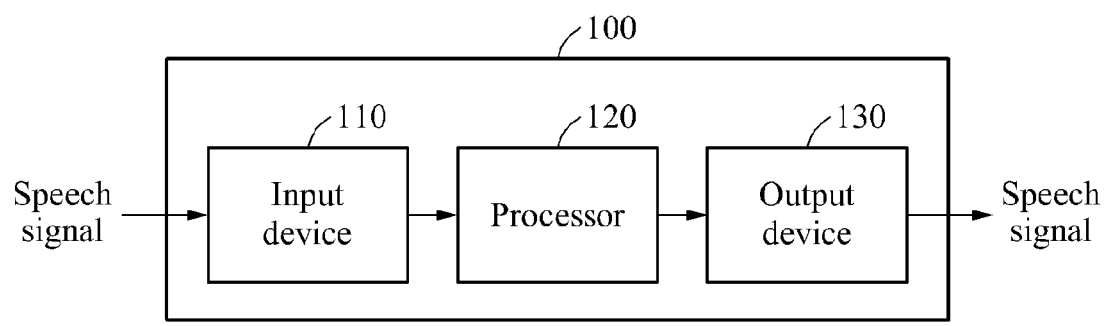
FIG. 1 is a diagram illustrating an example of a configuration of a speech signal preprocessing device.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations is described as an example; the sequence of operations is not limited to that set forth herein and may be changed as is known in the art, with the exception of steps and/or operations that necessarily occur in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure is thorough, complete, and conveys the full scope of the disclosure to one of ordinary skill in the art.

Illustrative examples described hereafter may be applicable to a speech signal processing method and various machine learning methods used for recognition or classification of successive input signals.

FIG. 1 is a diagram illustrating an example of a configuration of a speech signal preprocessing device 100.

Referring to FIG. 1, the speech signal preprocessing device 100 includes an input device 110, a processing device 120, and an output device 130.

The input device 110 receives an input speech signal. The input speech signal may include an audio signal, for example, a human voice; however, other types of audio signals also may be received. The input device 110 may be implemented, for example, by a receiver, a transceiver, a memory device, and/or an interface, among others, or any other component that may receive the speech signal and/or provide the speech signal in a format that may be understood and processed by the processing device 120.

The frames may be generated by dividing the speech signal at intervals shorter than a length of a frame. Thus, the frames may include an overlapping range between at least successive frames. The frames may be arranged in a chronological sequence.

For example, the input speech signal may include a plurality of frames each having a length l. The frames may be generated by dividing the input speech signal at intervals shorter than the length l and assigning a frame to correspond to the beginning, or some other time, of each interval. Thus, the frames may be arranged in a chronological sequence corresponding to the intervals such that a range overlaps between at least successive frames.

The processing device 120 preprocesses the input speech signal. For example, the processing device 120 extracts at least one frame corresponding to a speech recognition range from the frames included in the input speech signal. A speech recognition range is a range corresponding to a predetermined unit of a speech signal, as explained in further detail below. The processing device 120 generates at least one supplementary frame to facilitate speech recognition performed on a speech signal with respect to the speech recognition range corresponding to the extracted frame. The processing device 120 configures an output speech signal using the generated at least one supplementary frame and the frames included in the input speech signal.

The processing device 120 outputs the output speech signal through the output device 130. The output device may be implemented, for example, by a transmitter, a transceiver, a memory device, and/or an interface, or any other component that may receive the preprocessed speech signal in a format that is output from the processing device.

Speech signal preprocessing may be performed by dividing an input speech signal into predetermined ranges. The predetermined ranges may be based on a predetermined unit. For example, any one of a phoneme, a syllable, and a word included the speech signal may be used as a range of the speech signal. In one example, when speech recognition is performed based on phonemes, the processing device 120 may divide an input speech signal into units of phonemes and perform the speech signal preprocessing for each range, for example, each phoneme unit. For ease of description hereinafter, the predetermined range is referred to as a speech recognition range, and the speech preprocessing may be performed in units of phonemes.

The speech recognition range may be distinguished based on a start boundary and end boundary for each predetermined unit. For example, boundary information identifying the start and end boundaries of a speech recognition range of a speech signal may be predicted based on an alignment algorithm, such as a Gaussian mixture model. The boundary information may include time information that partitions the speech signal by the speech recognition range.

The processing device 120 extracts, from the frames, at least one frame including a boundary as identified by the boundary information that partitions the speech signal by the speech recognition range. The processing device 120 extracts the at least one frame corresponding to the time information in the boundary information.

A supplementary frame may be a frame to facilitate speech recognition with respect to the speech recognition range. The supplementary frame may be generated based on the at least one extracted frame. In an example, the processing device 120 may generate the supplementary frame by copying the at least one extracted frame. In another example, the processing device 120 may generate the supplementary frame by reconstructing the at least one extracted frame. In yet another example, the processing device 120 may generate the supplementary frame by one of: copying the at least one extracted frame or reconstructing the at least one extract frame based on a determined loss range of the frame.

The processing device 120 configures a preprocessed speech signal by disposing the at least one supplementary frame among the frames of the input speech signal based on time information of the at least one supplementary frame. The processing device 120 configures the preprocessed speech signal by chronologically arranging the at least one supplementary frame among the frames of the input speech signal.

The output device 130 outputs the preprocessed speech signal. The output device 130 outputs the preprocessed speech signal including the at least one supplementary frame and the frames. The output speech signal may be recognized using speech recognition processing and converted to text or some other desired output.

Figure 2:
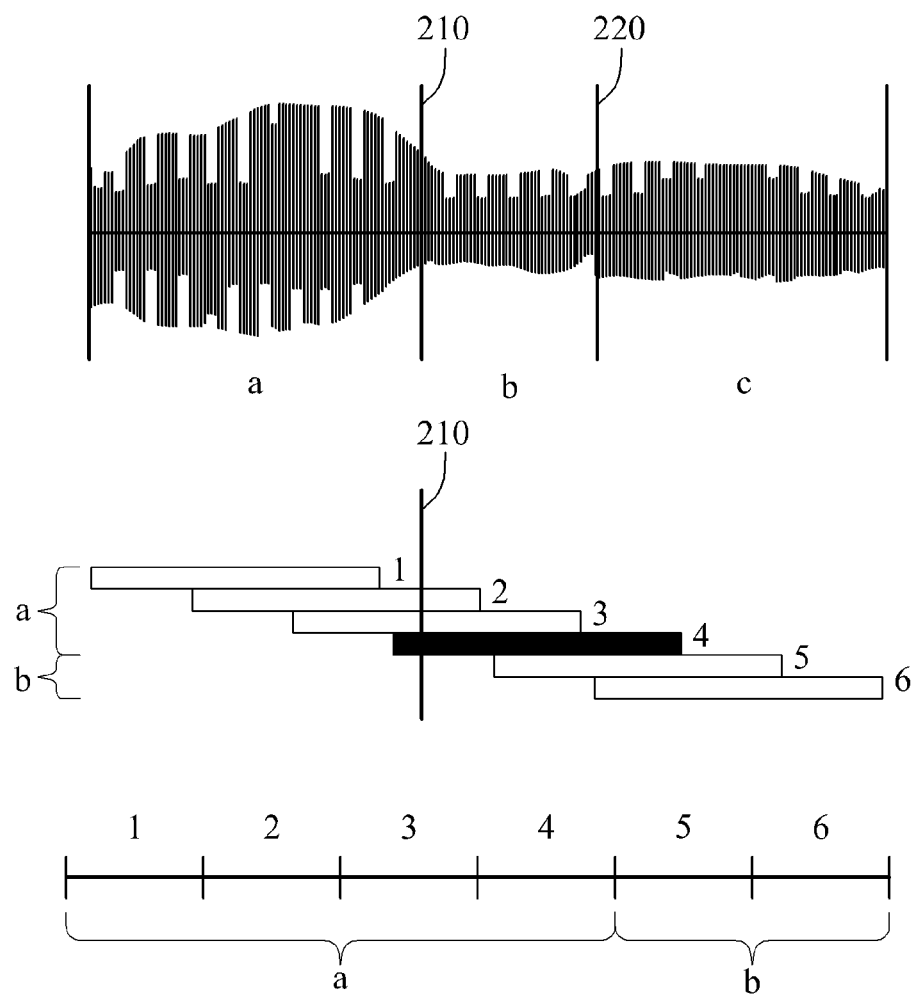
FIG. 2 is a diagram illustrating an example of extracting at least one frame corresponding to a speech recognition range from frames included in a speech signal.

FIG. 2 is a diagram illustrating an example of extracting at least one frame corresponding to a speech recognition range from frames included in a speech signal.

Referring to FIG. 2, a speech signal includes a plurality of phonemes. In the example of FIG. 2, the speech signal includes three phonemes: a, b, and c. The phonemes are separated by boundaries. For example, boundary 210 is identified by information partitioning the phonemes a and b. Boundary 220 is identified by information partitioning the phonemes b and c. In one example, the boundaries 210 and 220 are identified by information indicating a time in the speech signal. The following description focuses on the boundary 210 partitioning the phonemes a and b; however, one will appreciate that the principles and features discussed below may be readily applied to other boundaries in the speech signal, such as, for example, boundary 220.

As illustrated in FIG. 2, the speech signal includes a plurality of frames, for example, frames 1, 2, 3, 4, 5, and 6. The speech signal may be divided into intervals shorter than the length of a frame. A different frame may correspond to the start of each interval. Thus, the frames 1 through 6 may include an overlapping range between at least successive frames. As shown in FIG. 2, the frames 1 through 6 include overlapping ranges.

A speech signal preprocessing device may process the speech signal based on boundary information for the speech signal. For example, the speech signal preprocessing device may use the boundary information to extract frames 2, 3, and 4 as at least one frame including the boundary 210. The speech signal preprocessing device may generate at least one supplementary frame based on the extracted frames 2 through 4, as explained in further detail below.

The speech signal preprocessing device may generate the at least one supplementary frame based on all of the extracted frames or a subset of the extracted frames. For example, the speech signal preprocessing device may generate the at least one supplementary frame based on all of the extracted frames 2 through 4. In another example, the speech signal preprocessing device may generate the at least one supplementary frame based on the extracted frames 3 and 4. In yet another example, the speech signal preprocessing device may generate the at least one supplementary frame based solely on the extracted frame 4.

The speech signal shown in FIG. 2 may illustrate an input speech signal prior to the generation of at least one supplementary frame. In this example, assuming a speech recognition range of phonemes, the phoneme a may be recognized using the frames 1 through 4, and the phoneme b may be recognized using the frames 5 and 6, as illustrated in FIG. 2.

Figure 3:
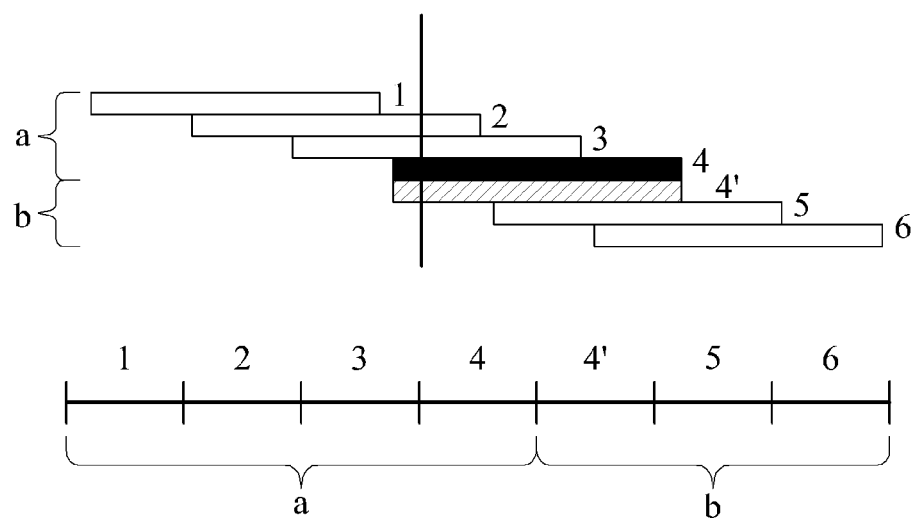
FIGS. 3 and 4 are diagrams illustrating examples of generating a supplementary frame by copying at least one frame.
Figure 4:
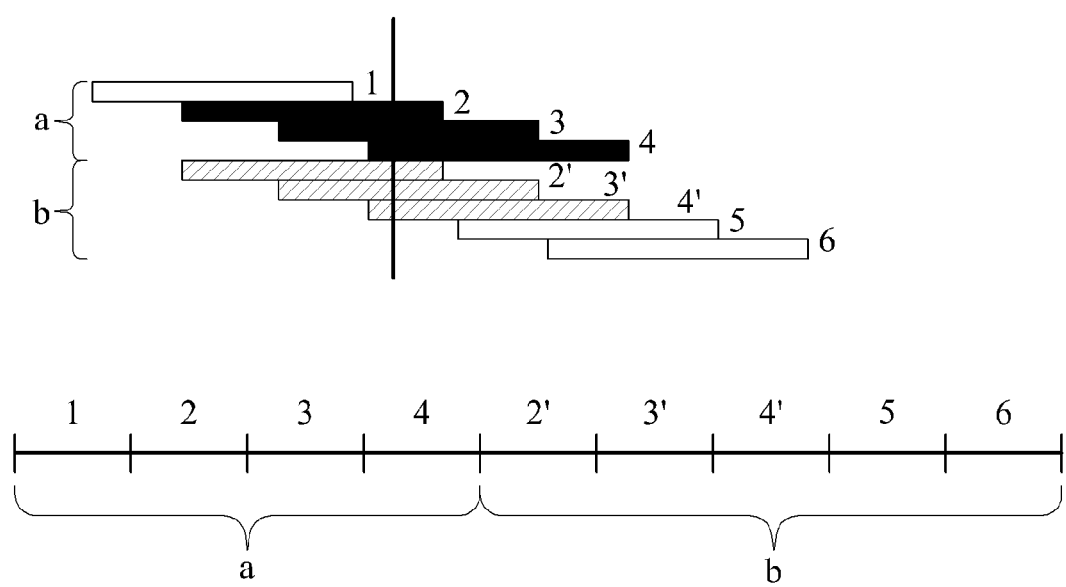

FIGS. 3 and 4 are diagrams illustrating examples of generating a supplementary frame by copying at least one frame of the speech signal shown in FIG. 2.

Referring to FIG. 3, a speech signal preprocessing device generates a supplementary frame 4' by copying only a single frame, for example, the last frame, frame 4, of the at least one extracted frame, for example, the frames 2 through 4. Since the supplementary frame 4' is generated by copying the frame 4, the supplementary frame 4' may include a feature vector that is included in the frame 4. The speech signal preprocessing device may chronologically dispose the supplementary frame 4' among a plurality of frames, for example, frames 1 through 6, of the speech signal. Thus, the supplementary frame 4' may be disposed between the frames 4 and 5, as shown in FIG. 3. The speech signal preprocessing device may output a preprocessed speech signal including the supplementary frame 4' and the frames 1 through 6.

According to this example, the phoneme a may be recognized using the frames 1 through 4, and the phoneme b may be recognized using the supplementary frame 4' and the frames 5 and 6.

Referring to FIG. 4, a speech signal preprocessing device generates supplementary frames 2', 3', and 4' by copying all of the at least one extracted frame, for example, frames 2, 3, and 4. The speech signal preprocessing device may chronologically dispose the supplementary frames 2' through 4' among a plurality of frames, for example, the frames 1 through 6. Thus, the supplementary frames 2' through 4' may be disposed between frames 4 and 5, as shown in FIG. 4. The speech signal preprocessing device may output a preprocessed speech signal including the supplementary frames 2' through 4' and the frames 1 through 6.

In this example, the phoneme a may be recognized using the frames 1 through 4, and the phoneme b may be recognized using the supplementary frames 2' through 4' and the frames 5 and 6.

Figure 5:
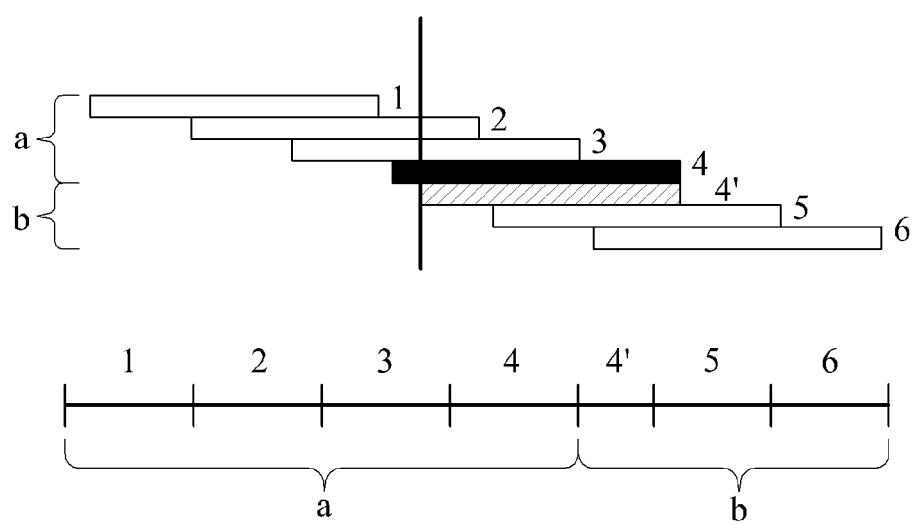
FIGS. 5 and 6 are diagrams illustrating examples of generating a supplementary frame by reconstructing at least one frame.
Figure 6:
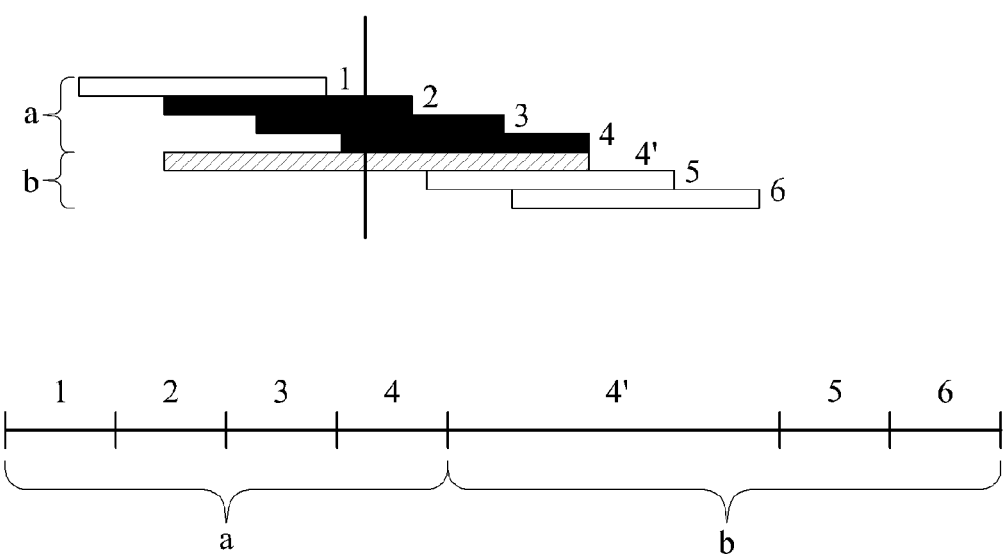

FIGS. 5 and 6 are diagrams illustrating examples of generating a supplementary frame that includes at least one frame that is reconstructed from the speech signal shown in FIG. 2.

Referring to FIG. 5, a speech signal preprocessing device generates a supplementary frame 4' by reconstructing only a last frame, for example, frame 4 of the at least one extracted frame, for example, frames 2 through 4. The speech signal preprocessing device generates the supplementary frame 4' by reconstructing the frame 4 from a portion corresponding to a speech recognition range of the frame 4. For example, the supplementary frame 4' is generated from the portion of the frame 4 corresponding to the phoneme b excluding the portion corresponding to the phoneme. Thus, the supplementary frame 4' may be a new frame, different from previously present frames that includes a feature vector corresponding to the phoneme b.

The speech signal preprocessing device may chronologically dispose the generated supplementary frame 4' among a plurality of frames, for example, frames 1 through 6 based on the start time information of each frame. Thus, the supplementary frame 4' may be disposed between the frames 4 and 5. The speech signal preprocessing device may output a preprocessed speech signal including the supplementary frame 4' and the frames 1 through 6.

Thus, the phoneme a may be recognized using the frames 1 through 4, and the phoneme b may be recognized using the supplementary frame 4' and the frames 5 and 6.

Referring to FIG. 6, a speech signal preprocessing device generates a supplementary frame 4' by reconstructing the at least one extracted frame, for example, frames 2 through 4.

In this example, the supplementary frame 4' is a long frame having a length longer than other frames. The supplementary frame 4' may include a feature vector of the frames 2 through 4.

The speech signal preprocessing device may chronologically dispose the generated supplementary frame 4' among a plurality of frames, for example, frames 1 through 6 based on the end time information of each frame. Thus, the supplementary frame 4' may be disposed between the frames 4 and 5. The speech signal preprocessing device may output a preprocessed speech signal including the supplementary frame 4' and the frames 1 through 6.

Thus, a phoneme the may be recognized using the frames 1 through 4, and the phoneme b may be recognized using the supplementary frame 4' and the frames 5 and 6.

The speech signal preprocessing device may generate a supplementary frame by applying a weighted value to the at least one extracted frame. The speech signal preprocessing device may generate the supplementary frame by applying the weight value to the at least one extracted frame based on time information of the at least one extracted frame. Referring to the example shown in to FIG. 4, when comparing the frame 2 and the frame 3, the difference between start time of the frame 2 and the boundary 210 is greater than the difference between the start time of the frame 3 and the boundary 210. Thus, the speech signal preprocessing device may generate the supplementary frame 4' by applying a weighted value to the frame 2 that is smaller than a weighted value applied to the frame 3. Similarly, the speech signal preprocessing device may generate the supplementary frame 4' by applying a weighted value to the frame 4 that is greater than the weighted value applied to the frame 3.

For example, the speech signal preprocessing device may apply a weighted value to the at least one extracted frame that is inversely proportional to the interval of time between the start of the at least one extracted frame and a boundary included in the at least on extracted frame. An increase in the interval between the start time of the at least one extracted frame and the boundary indicates a corresponding increase in loss information. Thus, when the interval between the start time of each of the at least one extracted frame and the boundary increases, the speech signal preprocessing device may apply a smaller weighted value to a corresponding extracted frame.

The speech signal preprocessing device may generate a supplementary frame by applying a weighted value to the at least one extracted frame based on a loss range of the corresponding at least one extracted frame. The loss range of the at least one extracted frame is be described with reference to FIG. 7. Thus, the speech signal preprocessing device may generate the supplementary frame by applying a sequentially increasing weighted value based on an order of the frame 2, the frame 3, and the frame 4.

Figure 7:
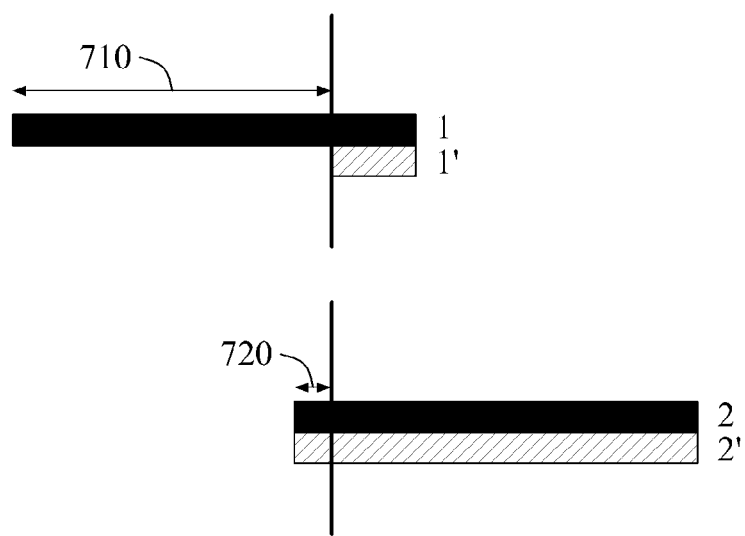
FIG. 7 is a diagram illustrating an example of generating a supplementary frame based on a loss range of at least one frame.

FIG. 7 is a diagram illustrating an example of generating a supplementary frame based on a loss range of at least one extracted frame.

A loss range refers to a portion of a frame that may not be used for speech recognition preprocessing based on a speech recognition range. For example, the loss range may correspond to the remainder of at least one frame from which a speech recognition range has been excluded. The loss range may be defined based on the start time of a frame and the boundary partitioning the speech recognition range that occurs within the frame.

Referring to FIG. 7, in one example a frame 1 includes a loss range 710, and in another example a frame 2 includes a loss range 720. A speech signal preprocessing device may adaptively generate a supplementary frame based on a loss range of at least one extracted frame. Based on the loss range of the at least one extracted frame, the speech signal preprocessing device may generate the supplementary frame by 1) copying the at least one frame, or 2) reconstructing the at least one frame.

In one example, when the length of the loss range of the at least one extracted frame exceeds half of the length of the at least one extracted frame, the speech signal preprocessing device may generate the supplementary frame by reconstructing the at least one extracted frame. In the example shown in FIG. 7, the loss range 710 of the frame 1 exceeds half the length of the frame 1. In such an example, the speech signal preprocessing device may generate a supplementary frame 1' by reconstructing the frame 1. Thus, the speech signal preprocessing device may generate a supplementary frame using a portion of the at least one extracted frame as determined by the speech recognition range.

In another example, when the length of the loss range of the at least one extracted frame does not exceed half of the length of the frame, the speech signal preprocessing device may generate the supplementary frame by copying the at least one extracted frame. In the example shown in FIG. 7, the loss range 720 of the frame 2 does not exceed half the length of the frame 2. In such an example, the speech signal preprocessing device may generate a supplementary frame 2' by copying the frame 2. Thus, the speech signal preprocessing device may generate a supplementary frame using the entire at least one extracted frame as determined by the speech recognition range.

In FIGS. 3 through 7, the supplementary frames are illustrated as shaded frames.

Figure 8:
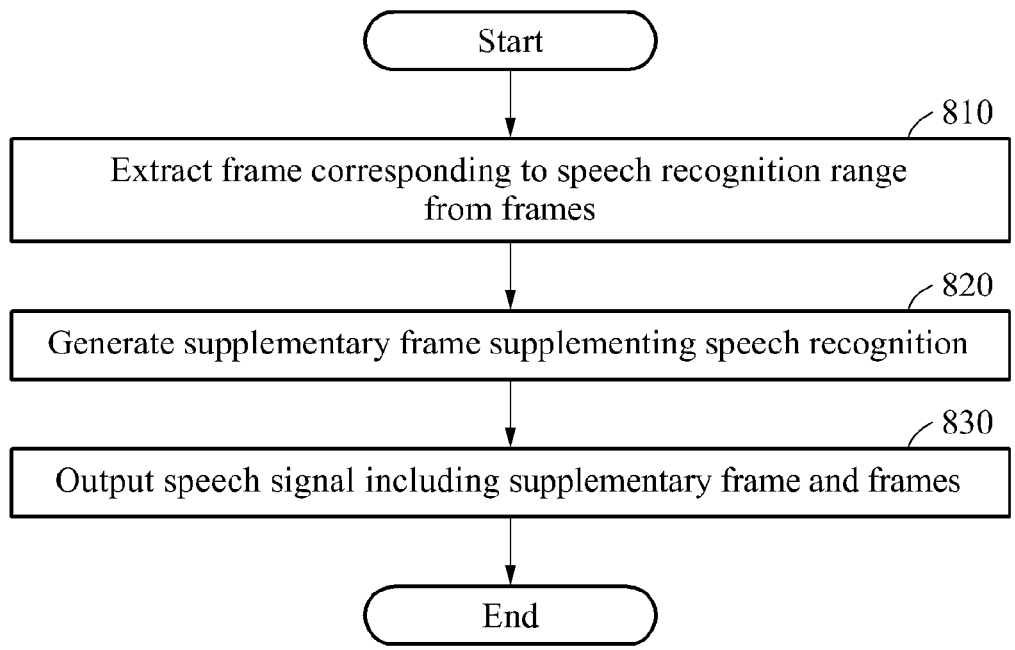
FIG. 8 is a flowchart illustrating an example of a speech signal preprocessing method.

FIG. 8 is a flowchart illustrating an example of a speech signal preprocessing method.

The speech signal preprocessing method may be performed by a processing device included, for example, in a speech signal preprocessing device.

Referring to FIG. 8, in operation 810, the speech signal preprocessing device extracts at least one frame corresponding to a speech recognition range from a plurality of frames included in an input speech signal. The frames may be generated by dividing the input speech signal into intervals shorter than the length of a frame and assigning a frame to a corresponding interval such that range between at least successive frames overlap. The at least one frame which the speech signal preprocessing device extracts is at least one frame associated with boundary information identifying a boundary that partitions the speech recognition range. In other words, the at least one frame corresponding to a speech recognition range from the plurality of frames represents at least one frame comprising a boundary that partitions the speech recognition range. For example, the speech recognition range The boundary information identifying the boundary may be predicted based on an alignment algorithm, such as a Gaussian mixture model. The boundary information may include time information partitioning a speech recognition range of the signal.

In operation 820, the speech signal preprocessing device generates at least one supplementary frame that supplements the input speech signal with respect to the speech recognition range based on the at least one extracted frame.

In one example, the speech signal preprocessing device may generate the at least one supplementary frame by copying the at least one frame.

In another example, the speech signal preprocessing device may generate a supplementary frame by reconstructing the at least one extracted frame. For example, the speech signal preprocessing device may generate a supplementary frame by reconstructing a portion of the at least one extracted frame that corresponds to the speech recognition range. In another example, the speech signal preprocessing device may generate the at least one supplementary frame by applying, to the at least one extracted frame, a weighted value based on time information of the at least one extracted frame.

In addition, the speech signal preprocessing device may adaptively generate the at least one supplementary frame based on a loss range of the at least one extracted frame. The speech signal preprocessing device may generate the at least one supplementary frame using a process which determines how to generate the at least one supplementary frame based on the loss range of the at least one extracted frame. For example, when the loss range of the at least one extracted frame exceeds half of the length of the at least one extracted frame, the speech signal preprocessing device generates the supplementary frame by reconstructing the at least one extracted frame. Conversely, when the loss range of the at least one extracted frame does not exceed half of the length of the at least one extracted frame, the speech signal preprocessing device generates the supplementary frame by copying the at least one extracted frame.

In operation 830, the speech signal preprocessing device outputs a preprocessed speech signal including the at least one supplementary frame and the frames of the input speech signal. The speech signal preprocessing device may output the preprocessed speech signal in which the at least one supplementary frame is disposed among the frames of the input speech signal based on time information of the at least one supplementary frame.

Figure 9:
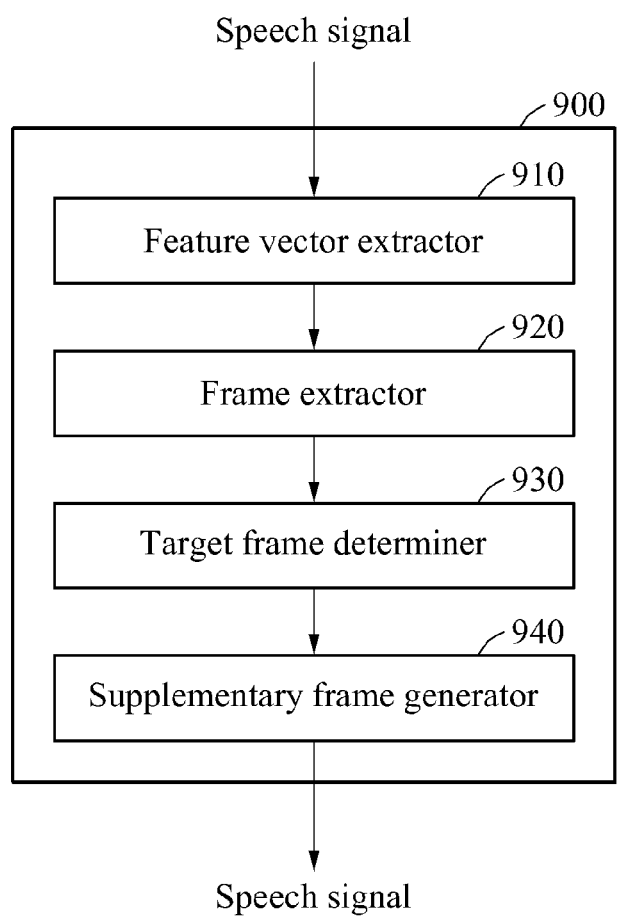
FIG. 9 is a diagram illustrating another example of a configuration of a speech signal preprocessing device.

FIG. 9 is a diagram illustrating another example of a configuration of a speech signal preprocessing device 900.

Referring to FIG. 9, the speech signal preprocessing device 900 includes a feature vector extractor 910, a frame extractor 920, a target frame determiner 930, and a supplementary frame generator 940. These components of the speech signal processing device may be implemented, for example, using one or more processing devices executing instructions embodying the operations given below for FIG. 10.

The feature vector extractor 910 extracts a feature vector from an input speech signal and generates a plurality of frames by dividing the feature vector comprised in the input speech signal at intervals shorter than a length of a frame. For example, the feature vector extractor 910 may extract, from the input speech signal, feature vector in a form of a Mel frequency cepstral coefficient (MFCC) or a filter bank. The frames may be generated by dividing the speech signal at intervals shorter than lengths of the frames and assigning a frame to a corresponding interval such that range between at least successive frames overlap.

The frame extractor 920 extracts at least one frame corresponding to a speech recognition range from the frames included in the input speech signal. The frame extractor 920 may extract, from the frames, the at least one frame including a boundary, as identified from boundary information, that partitions the input speech signal by the speech recognition range.

In one example, the frame extractor 920 may extract the at least one frame corresponding to the speech recognition range determined as in units of phonemes. In another example, the frame extractor 920 may extract the at least one frame corresponding to the speech recognition range determined in units of syllables. In yet another example, the frame extractor 920 may extract the at least one frame corresponding to the speech recognition range determined as in units of words.

The target frame determiner 930 determines a target frame from among the at least one frame. The target frame may be a frame that is fundamental to the generation of a supplementary frame. The target frame is illustrated one or more frames with black fill in FIGS. 2 through 7.

In one example, the target frame determiner 930 may determine that the last frame of the at least one extracted frame is the target frame. In another example, the target frame determiner 930 may determine that the first frame of the at least one extracted frame is the target frame. In yet another example, the target frame determiner 930 may determine that all or a portion of the at least one extracted frame is the target frame.

The supplementary frame generator 940 generates a supplementary frame that supplements input speech signal and facilitates speech recognition. The supplementary frame is generated with respect to the speech recognition range based on the determined target frame.

In one example, the supplementary frame generator 940 may generate a supplementary frame by copying the target frame. In another example, the supplementary frame generator 940 may generate the supplementary frame by reconstructing the target frame. For example, the supplementary frame generator 940 may generate the supplementary frame by reconstructing a portion of the target frame corresponding to the speech recognition range. The supplementary frame generator 940 may generate the supplementary frame by applying a weighted value to the target frame. The weighted value may be based on time information associated with the target frame.

In yet another example, the supplementary frame generator 940 may adaptively generate the supplementary frame using a process which determines how to generate the supplementary frame based on a loss range of the target frame. The loss range may refer to a portion of the range of a frame that is not used for speech recognition based on the corresponding speech recognition range. For example, the loss range may correspond to the remainder of the target frame from which a speech recognition range has been excluded. Based on the loss range of the target frame, the supplementary frame generator 940 may generate the supplementary frame by 1) copying the target frame or 2) reconstructing the target frame.

For example, when the loss range of the target frame exceeds half the length of the target frame, the supplementary frame generator 940 may generate the supplementary frame by reconstructing the target frame. Conversely, when the loss range of the target frame does not exceed half the length of the target frame, the supplementary frame generator 940 may generate the supplementary frame by copying the target frame.

The supplementary frame generator 940 outputs a preprocessed speech signal including the generated supplementary frame and the frames of the input speech signal. The supplementary frame generator 940 outputs the preprocessed speech signal by chronologically disposing the supplementary frame among the frames of the input speech signal.

Figure 10:
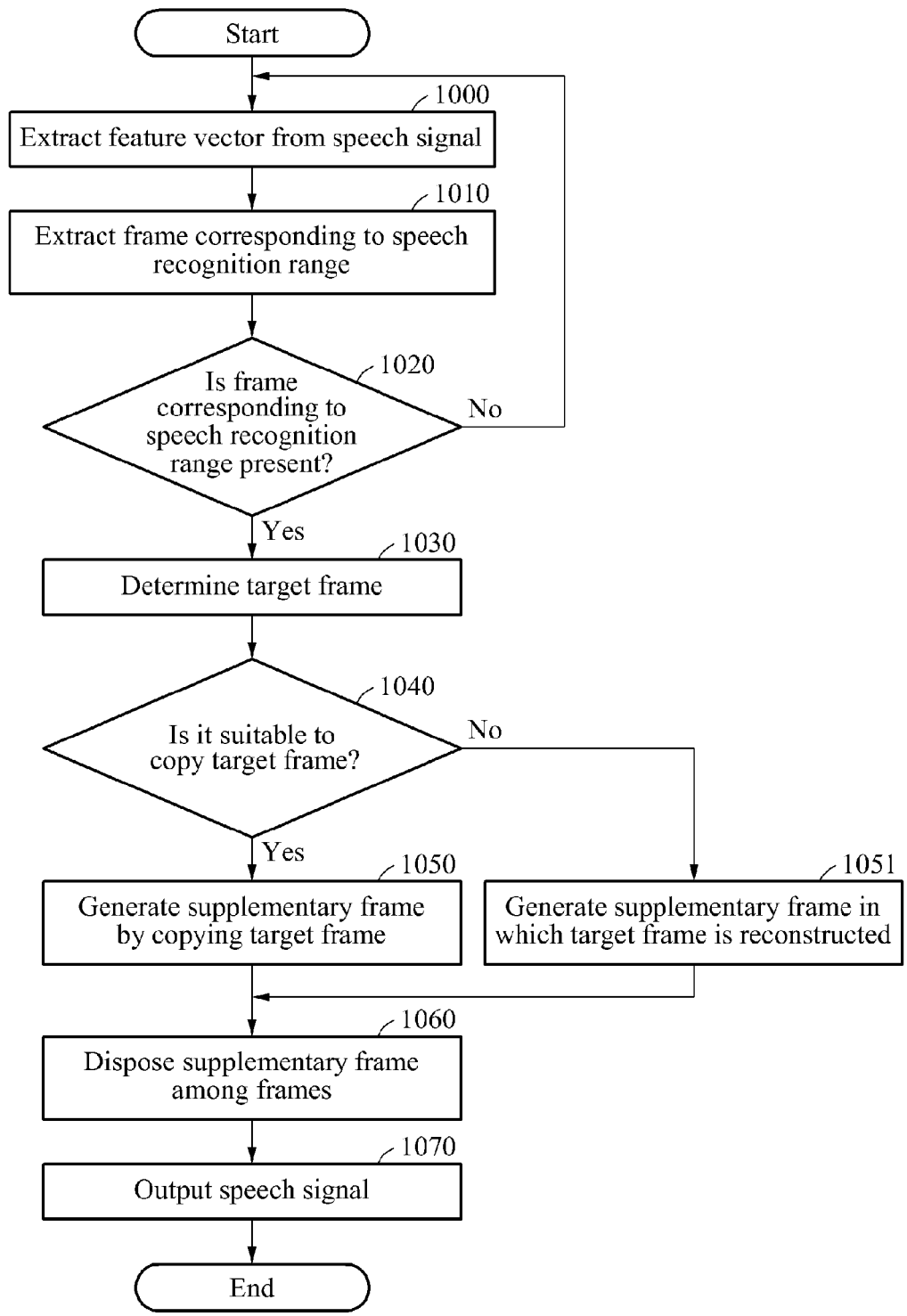
FIG. 10 is a flowchart illustrating another example of a speech signal preprocessing method.

FIG. 10 is a flowchart illustrating another example of a speech signal preprocessing method.

The speech signal preprocessing method may be performed by at least one processing device included in a speech signal preprocessing device.

Referring to FIG. 10, in operation 1000, the speech signal preprocessing device extracts a feature vector from an input speech signal. The speech signal preprocessing device may extract the feature vector from the speech signal in the form of an MFCC or a filter bank. The speech signal preprocessing device may generate a plurality of frames by dividing the feature vector comprised in the input speech signal at intervals shorter than a length of a frame. The frames may be generated by dividing the speech signal at intervals shorter than lengths of the frames, and assigning a frame to a corresponding interval such that ranges between at least successive frames overlap.

In operation 1010, the speech signal preprocessing device extracts at least one frame corresponding to a speech recognition range from the frames included in the input speech signal. The speech signal preprocessing device may extract, from the frames, the at least one frame including a boundary, as identified from boundary information, that partitions the input speech signal by the speech recognition range.

For example, the speech signal preprocessing device may determine the speech signal range based on units of any one unit of a phoneme, a syllable, and a word included in the speech signal. The speech signal preprocessing device may extract the at least one frame based on the boundary information indicating partitions of the input speech signal according to the determined speech recognition range.

In operation 1020, the speech signal preprocessing device determines whether the at least one frame corresponding to the speech recognition range is detected. For example, the speech signal preprocessing device may determine whether the at least one frame corresponding to the speech recognition range is detected by chronologically loading the frames and determining whether the frame includes a boundary associated with the speech recognition range. When the at least one frame corresponding to the speech recognition range is absent, the speech signal preprocessing device may re-extract a feature vector from the input speech signal.

In operation 1030, when the at least one frame corresponding to the speech recognition range is detected, the speech signal preprocessing device determines a target frame from among the at least one frame. The target frame may be a frame that is fundamental to the generation of a supplementary frame.

In one example, the speech signal preprocessing device may determine the last or the first frame of the at least one frame is the target frame. Alternatively, the speech signal preprocessing device may determine that all or a portion of the at least one frame is the target frame.

In operation 1040, the speech signal preprocessing device determines whether to the target frame is suitable for copying. The speech signal preprocessing device may determine whether the target frame is suitable for copying based on a process for generating the supplementary frame.

The speech signal preprocessing device may determine whether the target frame is suitable for copying based on a loss range of the target frame. For example, when the loss range of the target frame exceeds half of the length of the target frame, the speech signal preprocessing device may determine the target frame is not suitable for copying and reconstructing the target should be used to generate the supplementary frame. Conversely, when the loss range of the target frame does not exceed half of the length of the target frame, the speech signal preprocessing device may determine copying the target frame is suitable to generate the supplementary frame.

In operation 1050, when it is determined that the copying is suitable, the speech signal preprocessing device generates the supplementary frame by copying the target frame.

In operation 1051, when it is determined copying in not suitable, the speech signal preprocessing device generates the supplementary frame by reconstructing the target frame. In one example, the speech signal preprocessing device may generate the supplementary frame by reconstructing the target frame based on the portion of the target frame corresponding to the speech recognition range. In another example, the speech signal preprocessing device may generate the supplementary frame by applying a weighted value to the target frame based on time information associated with the target frame.

In operation 1060, the speech signal preprocessing device disposes the supplementary frame among the frames of the input speech signal based on time information associated with the supplementary frame. For example, the speech signal preprocessing device may chronologically dispose the supplementary frame among the frames of the input speech signal.

In operation 1070, the speech signal preprocessing device outputs a preprocessed speech signal including the supplementary frame and the frames of the input speech signal. The speech signal preprocessing device may output the preprocessed speech signal in which the supplementary frame is chronologically disposed among the frames of the input speech signal.

According to examples described herein, more accurate speech recognition may be performed based on a speech recognition range by generating a supplementary frame that facilitates speech recognition with respect to the speech recognition range by adding the supplementary frame to frames of the speech signal.

According to examples described herein, accuracy in speech recognition may be effectively improved by extracting at least one frame including a boundary that partitions the speech signal by a speech recognition range and generating a supplementary frame based on the at least one extracted frame, thereby preventing the addition of frames unnecessary for accurate speech recognition.

According to examples described herein, an unnecessary increase in a magnitude of a preprocessed speech signal may be prevented by generating a supplementary frame using a process that is adaptively determined based on a loss range of at least one extracted frame.

According to examples described herein, accuracy in speech recognition may be effectively improved through generation of a supplementary frame by applying, to at least one frame, a weighted value based on time information of at least one extracted frame.

According to examples described herein, preprocessing may be performed on various speech signals by determining a speech recognition range based on any one unit of a phoneme, a syllable, and a word.

The various modules, elements, and processes described above may be implemented using one or more hardware components, one or more software components implemented by a processing device, or a combination of one or more hardware components and one or more software components implemented by a processing device.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analogto-digital converters, digital-to-analog converters, relays, switches, transistors, diodes, antennas, receivers, transmitters, transceivers, integrated circuits, storage devices, buffers, and processing devices, among others.

A software component may be implemented, for example, by a processing device executing software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions executed a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of preprocessing a speech signal including a plurality of frames, the method comprising:
   extracting a frame corresponding to a speech recognition range from the plurality of frames in the speech signal;

generating a supplementary frame from the extracted frame to supplement speech recognition processing of the speech signal with respect to the speech recognition range; and outputting a preprocessed speech signal, which comprises the supplementary frame and the plurality of frames of the speech signal, for speech recognition processing.

2. The method of claim 1, wherein the plurality of frames of the speech signal are generated by dividing the speech signal at intervals shorter than the length of the plurality of frames to include an overlapping range between at least successive frames of the plurality of frames, and the extracting of the frame comprises extracting, from the plurality of frames of the speech signal, a frame comprising a boundary that partitions the speech recognition range based on boundary information associated with the extracted frame.

3. The method of claim 1, wherein the generating of the supplementary frame comprises generating the supplementary frame by copying the extracted frame.

4. The method of claim 1 wherein the extracting of a frame corresponding to a speech recognition range from the plurality of frames in the speech signal includes extracting a plurality of frames; and the generating of the supplementary frame comprises generating the supplementary frame by copying a plurality of the extracted frames.

5. The method of claim 1, wherein the generating of the supplementary frame comprises generating a supplementary frame by reconstructing the extracted frame.

6. The method of claim 1 wherein the extracting of a frame corresponding to a speech recognition range from the plurality of frames in the speech signal includes extracting a plurality of frames; and the generating of the supplementary frame comprises generating the supplementary frame by reconstructing a plurality of the extracted frames.

7. The method of claim 6 wherein the generating of the supplementary frame by reconstructing a plurality of the extracted frames includes generating the supplementary frame having a length longer than the plurality of frames of the speech signal to include a feature vector of the plurality of extracted frames.

8. The method of claim 6 wherein the generating of the supplementary frame by reconstructing a plurality of the extracted frames includes generating the supplementary frame by applying a weighted value to each extracted frame that is inversely proportional to the interval of time between the start of the each extracted frame and a boundary that partitions the speech recognition range included in the each extracted frame.

9. The method of claim 5, wherein the generating of the supplementary frame comprises generating the supplementary frame by reconstructing the extracted frame based on a portion of the extracted frame corresponding to the speech recognition range.

10. The method of claim 5, wherein the generating of the supplementary frame comprises applying a weighted value to the extracted frame, the weighted value based on time information associated with the extracted frame.

11. The method of claim 1, wherein the generating of the supplementary frame comprises generating of the supplementary frame based on a loss range of the extracted frame by one of copying the extracted frame and reconstructing the extracted frame.

12. The method of claim 11, wherein the loss range of the extracted frame corresponds to a remainder of a range of the extracted frame from which the speech recognition range has been excluded.

13. The method of claim 1 further comprising disposing the supplementary frame among the plurality of frames based on time information associated with the supplementary frame to generate the preprocessed signal.

14. The method of claim 1, wherein the speech recognition range corresponds to any one unit of a phoneme, a syllable, and a word comprised in the speech signal.

15. A non-transitory computer-readable storage medium comprising a program to preprocess a speech signal including a plurality of frames, the medium comprising instructions to cause one or more processing devices to perform the method of claim 1.

16. A speech signal preprocessing device, comprising:
an input device configured to receive a speech signal including a plurality of frames;
a processing device configured to
extract a frame corresponding to a speech recognition range from the plurality of frames in the speech signal;
generate a supplementary frame from the extracted frame to supplement speech recognition processing of the speech signal with respect to the speech recognition range; and
generate a preprocessed signal comprising the supplementary frame and the plurality of frames; and
an output device configured to output the preprocessed speech signal for speech recognition processing.

17. The device of claim 16, wherein the plurality of frames of the speech signal are generated by dividing the speech signal at intervals shorter than the length of the plurality of frames to include an overlapping range between at least successive frames of the plurality of frames, and the processor is further configured to extract, from the plurality of frames, a frame comprising a boundary that partitions the speech recognition range based on boundary information associated with the extracted frame.

18. The device of claim 16, wherein the processor is configured to generate the supplementary frame by copying the extracted frame.

19. The device of claim 16 wherein the processor is further configured to extract a plurality of frames; and to generate the supplementary frame by copying a plurality of the extracted frames.

20. The device of claim 16, wherein the processor is further configured to generate a supplementary frame by reconstructing the extracted frame.

21. The device of claim 16 wherein the processor is further configured to a plurality of frames; and to generate the supplementary frame by reconstructing a plurality of the extracted frames.

22. The device of claim 16, wherein the processor is further configured to generate the supplementary frame based on a loss range of the extracted frame by one of copying the extracted frame or reconstructing the extracted frame.

23. The device of claim 16, wherein the processor is further configured to dispose the supplementary frame among the plurality of frames based on time information associated with the supplementary frame to generate the processed signal.

* * * * *